United States Patent
Parsons et al.

(10) Patent No.: US 7,752,933 B2
(45) Date of Patent: Jul. 13, 2010

(54) SPEED CONTROLLED SPRING RETURN ACTUATOR

(75) Inventors: Gerald R. Parsons, Caledonia, IL (US); Eugene R. Jornod, Roscoe, IL (US)

(73) Assignee: TAC, LLC, Loves Park, IL (US)

( * ) Notice: Subject to any disclaimer, the term of this patent is extended or adjusted under 35 U.S.C. 154(b) by 529 days.

(21) Appl. No.: 11/750,828

(22) Filed: May 18, 2007

(65) Prior Publication Data

US 2008/0287260 A1  Nov. 20, 2008

(51) Int. Cl.
*F16H 19/00* (2006.01)
(52) U.S. Cl. .................. 74/319; 74/322; 74/665 B; 74/665 Q
(58) Field of Classification Search ............ 74/63, 74/64, 70, 83, 665 A, 665 B, 665 E, 665 Q, 74/319, 321, 322, 323, 324; 477/175
See application file for complete search history.

(56) References Cited

U.S. PATENT DOCUMENTS

| | | | |
|---|---|---|---|
| 2,738,033 A * | 3/1956 | Towle et al. | 185/40 R |
| 3,279,744 A | 10/1966 | Fieldsen et al. | |
| 3,889,924 A * | 6/1975 | Karpenko | 251/249.5 |
| 4,254,835 A | 3/1981 | Lichtgarn | |
| 4,287,428 A * | 9/1981 | Smith | 290/1 E |
| 4,572,333 A | 2/1986 | Westley | |
| 4,595,081 A | 6/1986 | Parsons | |
| 4,621,789 A * | 11/1986 | Fukamachi | 251/129.12 |
| 4,920,811 A | 5/1990 | Hopper | |
| 5,195,721 A | 3/1993 | Akkerman | |
| 5,295,562 A | 3/1994 | Hajny et al. | |
| 5,518,462 A | 5/1996 | Yach | |
| 5,662,542 A | 9/1997 | Birchmeier | |
| 5,983,743 A | 11/1999 | McGregor et al. | |
| 6,097,123 A | 8/2000 | Weiss et al. | |
| 6,431,317 B1 | 8/2002 | Coe | |

FOREIGN PATENT DOCUMENTS

| | | |
|---|---|---|
| GB | 2 211 274 | 6/1989 |
| JP | 11-094114 | 4/1999 |
| JP | 2004-044766 | 2/2004 |
| JP | 2004-150620 | 5/2004 |
| JP | 2004-176902 | 6/2004 |

\* cited by examiner

*Primary Examiner*—Ha D. Ho
(74) *Attorney, Agent, or Firm*—Reinhart Boerner Van Deuren P.C.

(57) ABSTRACT

An actuator including a motor, clutch, gear train, solenoid, clock spring, and air brake is provided. The motor is configured to drive a control valve. The clutch is operably coupled to the motor and configured to prevent the motor from transferring more than a predetermined amount of torque. The gear train is operably coupled to the clutch and configured to receive the predetermined amount of torque from the motor. The solenoid is operably coupled to the gear train and configured to disengage one of the gears in the gear train from adjacent gears. The clock spring is operably coupled to another of the gears in the gear train, configured to store mechanical energy supplied by the motor, and configured to drive the control valve. The air brake is operably coupled to the gear train and configured to dissipate a portion of the mechanical energy released by the clock spring.

20 Claims, 7 Drawing Sheets

SPEED CONTROLLED SPRING RETURN ACTUATOR

FIELD OF THE INVENTION

This invention generally relates to actuators and, more particularly, to an electro-mechanical actuator for operating a valve to control a flow of fluid.

BACKGROUND OF THE INVENTION

Commercial building heating, ventilating and air conditioning (HVAC) systems typically utilize automatically controlled heating and cooling valves to properly zone and circulate heated or chilled liquid to heat or cool the building, respectively. These heating and cooling valves may be ball valves, which have a ball-shaped valving member that is rotated by an actuator to selectively allow or prevent the flow of liquid therethrough. The actuator typically utilizes a small electric motor whose output is coupled through a speed reducing, torque multiplying gear train to rotate the valving member between its open and closed positions.

The actuators in such a system also include a fail safe mechanism that will properly position the valving member of the heating and cooling valves into a known state upon loss of electric power to the actuator. Typically, this fail safe mechanism is in the form of a spring return mechanism. During operation, the spring is wound during operation of the motor when the valving member is rotated from one position, i.e. its fail safe position, to the other. If electric power is lost at any time that the valving member is not positioned in its fail safe position, the spring operates to rotate the valving member back to its fail safe position.

Unfortunately, while the speed at which the spring is wound and unwound is controlled by the motor during normal operation, upon a loss of electric power, the driving speed of the spring return is limited only by the gear train and valve resistance. Since the gear train and valve resistances are designed to be low to increase efficiency during normal operation, this driving speed may become excessive. This excessive speed can destroy the gear train due to impact when the output gear contacts the stop at the end of the rotation.

One electro-mechanical actuator that overcomes this problem is disclosed in U.K. Patent Appln. G.B. 2,221,274 A entitled "Electro-mechanical actuators" filed on Oct. 21, 1987. This electro-mechanical actuator utilizes a wound coil spring to return the output member to a fail safe position when the electric supply to the electric motor fails. Unlike prior actuators, however, the release of energy by the coil spring is controlled by an air brake. This air brake utilizes a gear train mounted on the valve drive rod to spin a paddle mounted on a spindle. When the coil spring releases its energy upon a failure of the electric supply to the electric motor, the spring rotates the valve drive rod which, through the air brake drive train, rotates the paddle member. The rotating paddle member acts on the ambient air to provide a braking action or increased resistance, which controls the speed at which the valve is returned to prevent damage.

Unfortunately, the above-noted electro-mechanical actuator has drawbacks. For example, the electro-mechanical actuator requires two gear trains, namely a normal gear train for driving the output member and a parasitic gear train for driving the paddle. Because two separate and distinct gear trains are required, the number of components that need to be purchased, assembled, maintained, and potentially replaced is increased. Therefore, the cost of constructing and operating the electro-mechanical actuator is likely substantially increased.

In addition, the parasitic gear train in the above-noted electro-mechanical actuator includes gears progressing from the valve drive rod to the paddle wheel in a configuration that increases the rotational speed to the paddle. Therefore, the paddle spins fast and provides a breaking force against the rotation of the valving member even when the electric motor is driving the valving member under normal operation. As a result, the paddle wheel undesirably supplies the braking action to the electric motor, reducing the efficiency of the motor. In other words, the braking force of the paddle wheel counteracts the driving force of the electrical motor even though the paddle wheel was really included in the electro-mechanical actuator to control the release of energy from the coil spring.

There exists, therefore, a need in the art for an electro-mechanical actuator that overcomes one or more of the problems present in the art. The invention provides such an electro-mechanical actuator. These and other advantages of the invention, as well as additional inventive features, will be apparent from the description of the invention provided herein.

BRIEF SUMMARY OF THE INVENTION

In view of the above, embodiments of the present invention provide a new and improved actuator that overcomes one or more of the problems existing in the art. More particularly, embodiments of the present invention provide new and improved spring return actuators that provide a controlled speed spring return operation to position a valving member in a fail safe position upon the loss of electric power to the actuator. Such operation is provided without damage to the actuator or valve. Preferred embodiments provide such operation without unnecessarily reducing efficiency of the actuator during normal operation.

An electro-mechanical actuator constructed in accordance with one embodiment of the present invention includes a uniquely configured drive train that drives an air brake slowly when the motor is properly powered and is controlling the position of the valve member and drives the air brake quickly when the motor has lost power and the spring return is employed to return the valving member to its fail safe position. The operation of the air break prevents the spring from damaging the gear train, and perhaps other components, when the spring is called upon, and does not unnecessarily detract from the efficiency of the motor when under normal powered control. The actuator is configured to drive an air brake at different rates of speed depending on which input source, the electric motor or the spring, is driving the air brake. Therefore, the air brake does not substantially oppose the motor yet prevents damage to the actuator, and in particular the gear train, upon a loss of power to the actuator. The actuator also employs a single gear train mounted on a single base plate. Therefore, the actuator is relatively compact in size.

In one aspect, an actuator including a drive mechanism and an energy storage mechanism is provided. The drive mechanism is operably coupled through a first portion of a single gear train to an energy dissipation apparatus. The first portion of the single gear train has a first gear ratio of less than one to limit a rotational speed of the energy dissipation apparatus when the drive mechanism is powered. The energy storage member is operably coupled through a second portion of the single gear train to the energy storage apparatus. The energy storage member is configured to store energy provided by the drive mechanism. The second portion of the single gear train has a second gear ratio of greater than one to increase the rotational speed of the energy dissipation apparatus when the drive mechanism is not powered and the energy storage member is utilized.

In another aspect, an actuator including a drive mechanism, an energy storage mechanism, an energy dissipation apparatus, and a gear train is provided. The gear train is configured to operably couple the drive mechanism, the energy storage mechanism, and the energy dissipation apparatus to each other. As such, in a first state, the drive mechanism is operably coupled to the energy storage mechanism and the energy dissipation apparatus. However, in a second state, the energy storage mechanism is operably coupled to the energy dissipation apparatus. The drive mechanism drives the energy dissipation apparatus through the gear train at a first rate in the first state and the energy storage mechanism drives the energy dissipation apparatus through the gear train at a second rate in the second state. The second rate is greater than the first rate.

In yet another aspect, an actuator including a motor, a clutch, a gear train, a solenoid, a clock spring, and an air brake is provided. The motor is configured to drive a control valve. The clutch is operably coupled to the motor and configured to prevent the motor from transferring more than a predetermined amount of torque. The gear train is operably coupled to the clutch and configured to receive the predetermined amount of torque from the motor. The solenoid is operably coupled to the gear train and configured to disengage one of the gears in the gear train from adjacent gears. The clock spring is operably coupled to another of the gears in the gear train and configured to store mechanical energy supplied by the motor. The clock spring is configured to drive the control valve. The air brake is operably coupled to the gear train and configured to dissipate a portion of the mechanical energy released by the clock spring.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
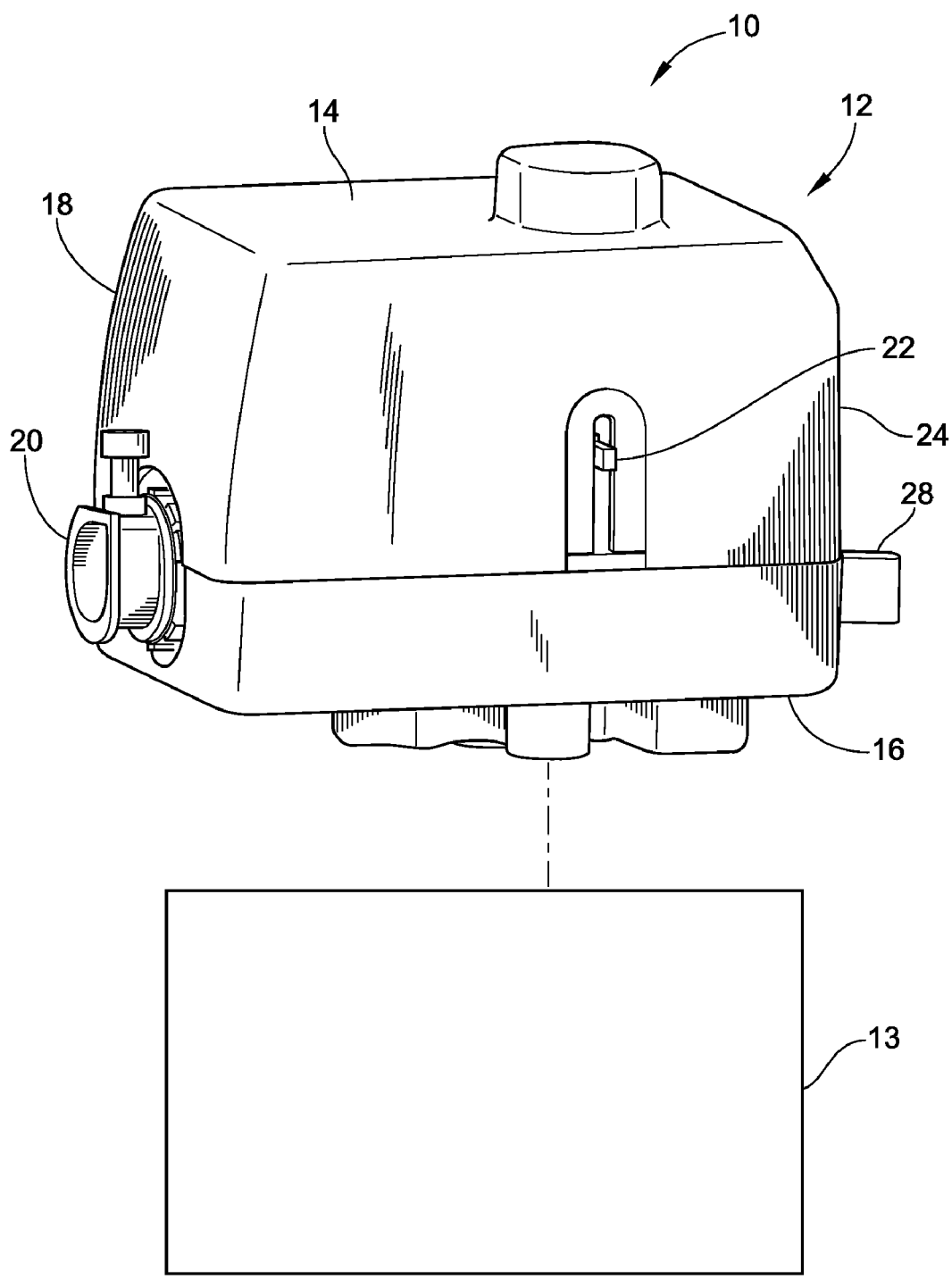
FIG. 1 is a perspective view of an exemplary embodiment of an actuator in accordance with the teachings of the present invention.
Figure 2:
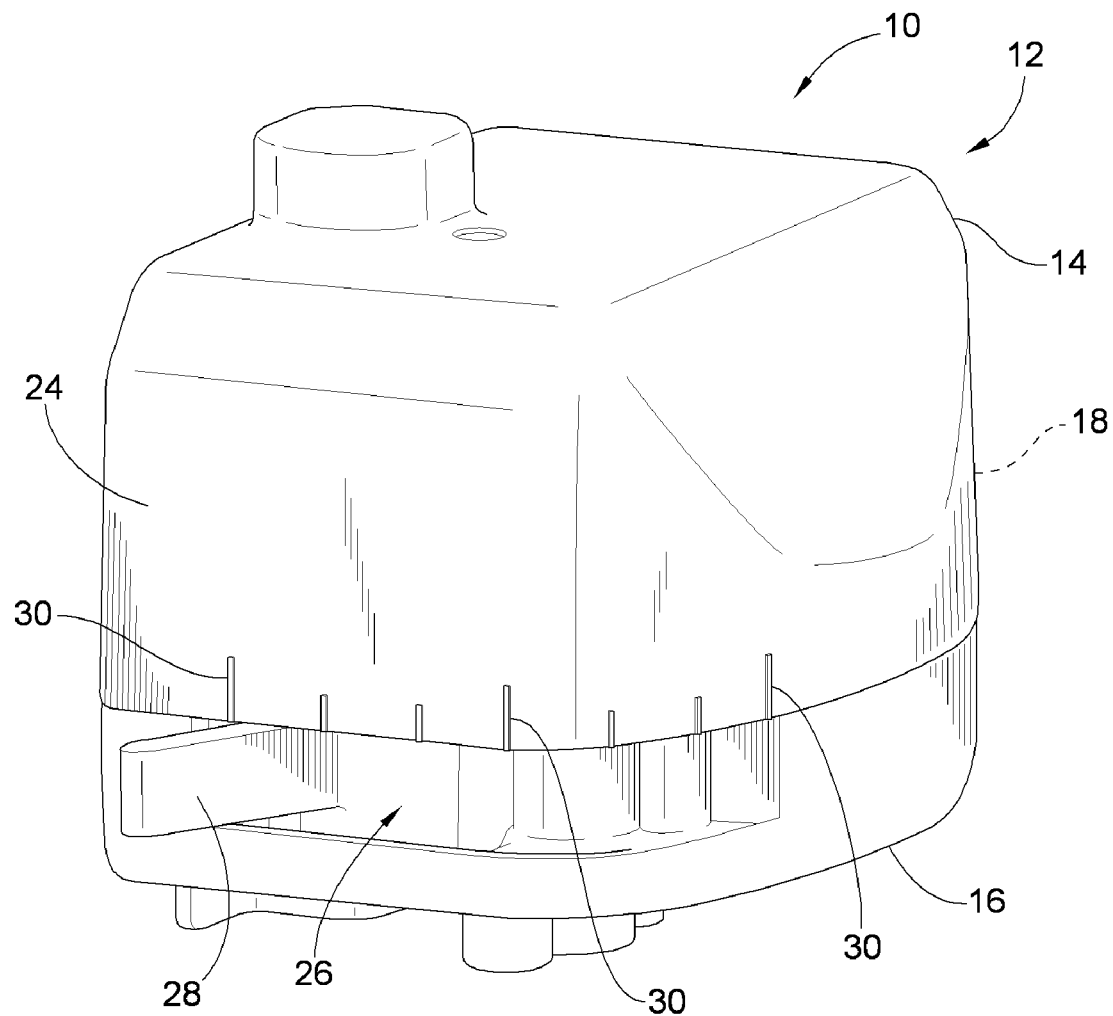
FIG. 2 is a perspective of the actuator of FIG. 1 viewed from a different vantage point.

Referring to FIGS. 1 and 2, an actuator 10 constructed in accordance with one embodiment of the present invention for controlling a heating or cooling valve is illustrated. It should be noted that while the following description will describe an embodiment of the present invention in terms of an exemplary environment, such description should be taken as exemplary only and not by way of limitation. Indeed, other embodiments operable in other environments are within the scope of the present invention as will be made apparent to those skilled in the art from the following description.

As shown in the illustrated embodiment of FIG. 1, the actuator 10 includes a housing 12 having an upper portion 14 and a lower portion 16. At one end 18 of the housing 12, the actuator 10 includes a coupling member 20. The coupling member 20 is generally configured to receive a field installed flexible cable (not shown). As such, the actuator 10 quickly, easily and releasably couples with, for example, an electrical source, a controller, or other equipment through electrical wiring.

Proximate the middle portion of the housing 12, the actuator 10 includes a manual release lever 22. As will be more fully explained below, the manual release lever 22 permits a user to manually open or close a control valve 13 being controlled by the actuator 10. As oriented in FIG. 1, to close the valve the manual release lever 22 is biased downwardly.

As shown more clearly in FIG. 2, another end 24 of the housing 14, the actuator 10 includes an elongate slot 26 having a valve position indicator 28 projecting therefrom. The valve position indicator 28 is configured to move back and forth within the elongate slot 26. The position of the valve position indicator 28 relative to the housing 12 corresponds to the position of the valve. As depicted in FIG. 2, because the housing 12 includes a set of indicia 30 (a.k.a., markings) on an outer surface, the position of the control valve may be determined by the user through visual inspection.

Figure 3:
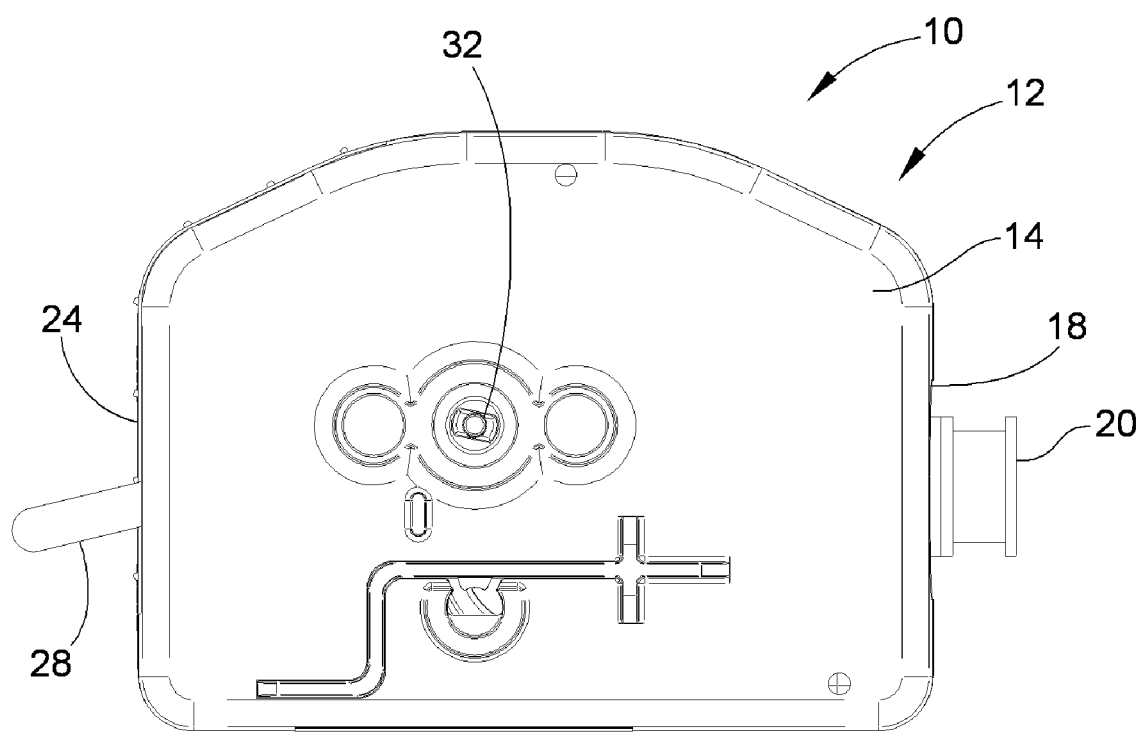
FIG. 3 is a bottom view of the actuator of FIG. 1.

Referring to FIG. 3, wherein the underside of the actuator 10 is depicted, the lower portion 16 of the housing 12 reveals a portion of a control valve drive member 32. In the illustrated embodiment, the control valve drive member 32 is unitarily formed with the valve position indicator 28. Therefore, as the control valve drive member 32 is rotated within the actuator 10, the control valve position indicator 28 is also moved.

Figure 4:
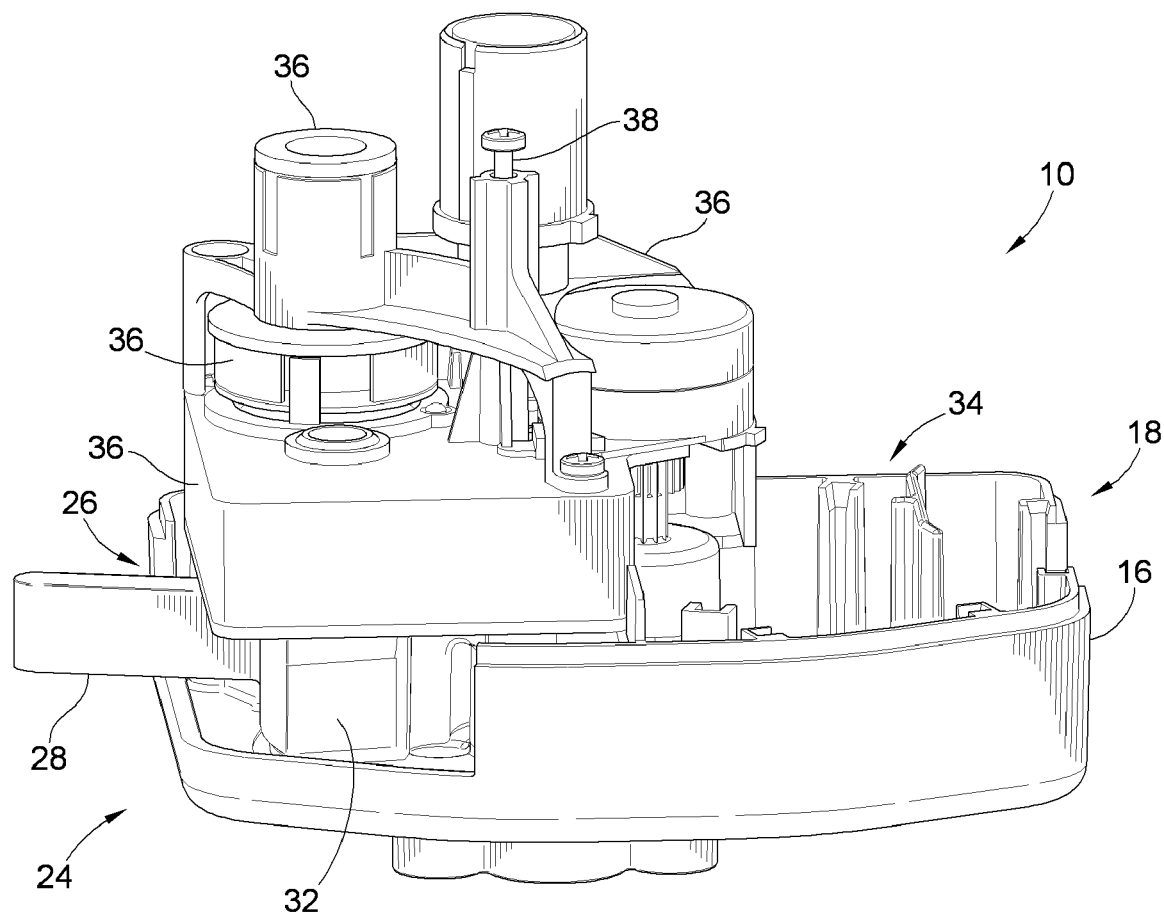
FIG. 4 is a perspective view of the actuator of FIG. 1 with an upper portion of the housing and a coupling member removed.

As shown in FIG. 4, the upper portion 14 of the housing 12 and the coupling member 20 have been removed to illustrate the inner cavity 34 of the actuator 10. Within the inner cavity 34, the actuator 10 includes a variety of structural members 36. In the illustrated embodiment, the structural members 36 provide the actuator with an internal framework. The structural members 36 are generally coupled to the upper and lower portions 16, 18 of the housing 12 by threaded connectors 38.

Figure 5:
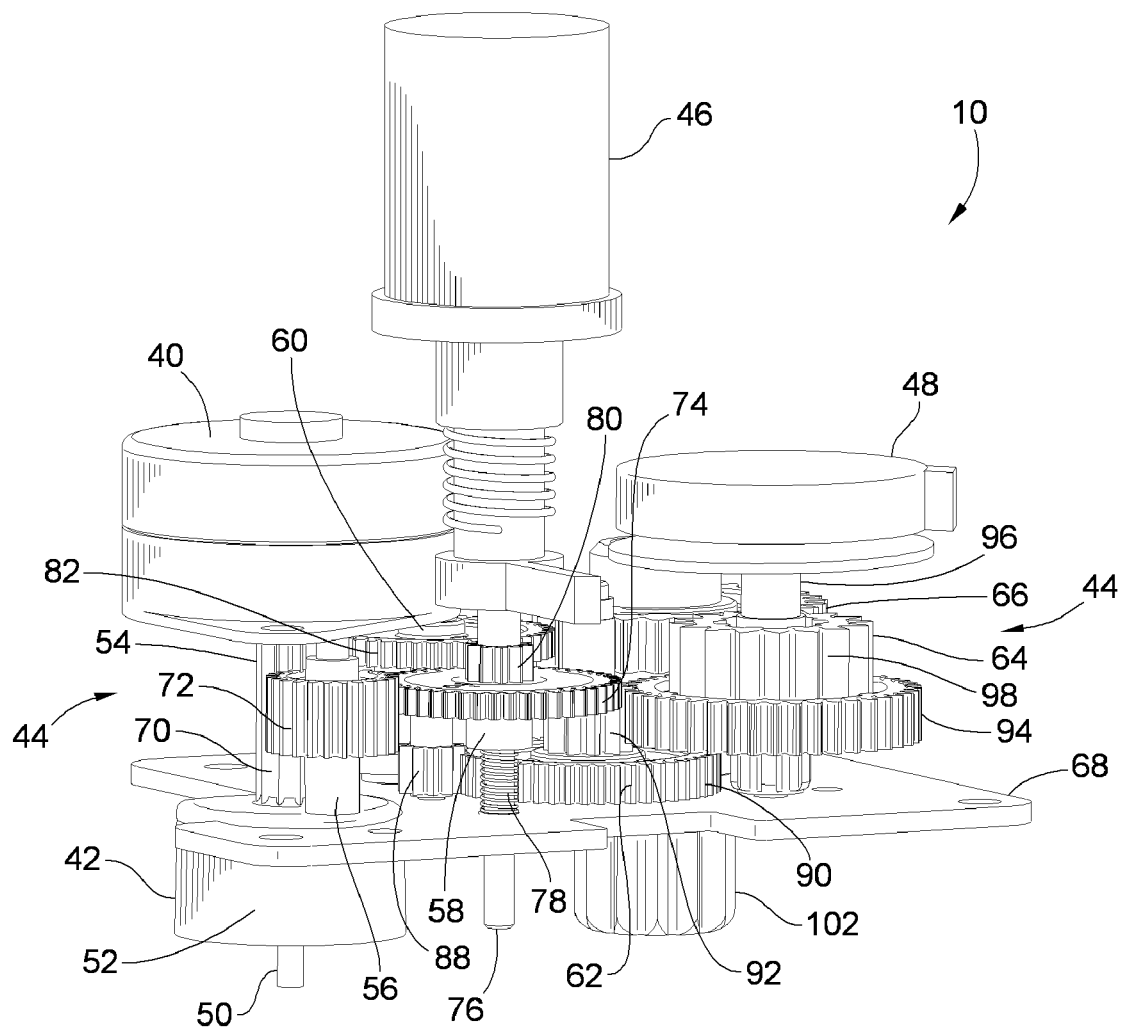
FIG. 5 is a perspective view of the actuator of FIG. 1 with the housing, coupling member, and valve control drive member removed to better illustrate a gear train.

In FIG. 5, the lower portion 16 of the housing 12, the structural members 36, and the control valve drive member 32 have been removed to better illustrate a motor 40, clutch 42, gear train 44, solenoid 46, and clock spring 48 within the actuator 10. The motor 40 is operably coupled to the gear train 44 and, as such, configured to drive the control valve (not shown) between open and closed positions. In the illustrated embodiment, the motor 40 is an electric motor having a shaft 50 depending downwardly from the motor as oriented in FIG. 5. As shown, the shaft 50 passes down through the clutch 42.

In the illustrated embodiment of FIG. 5, the clutch 42 is a magnetic slip clutch. The clutch 42 includes a bell-shaped housing 52 situated vertically below a drive shaft 54. The bell-shaped housing 52 has a magnetic ring circumferentially progressing along an inner wall and hides a magnet mounted on the shaft 50 of the motor 40. When the magnet on the shaft 50 is rotated by the motor 40, the bell-shaped housing 52 and the drive shaft 54 rotate. If the motor 40 attempts to transfer more than a predetermined amount of torque to the bell-shaped housing 52 and drive shaft 54, the magnetic field of the clutch 42 is overcome and the clutch 42 slips. Therefore, the gear train 44, and possibly other components of the actuator 10 or the control valve, are spared from damage due to excessive forces.

Figure 6:
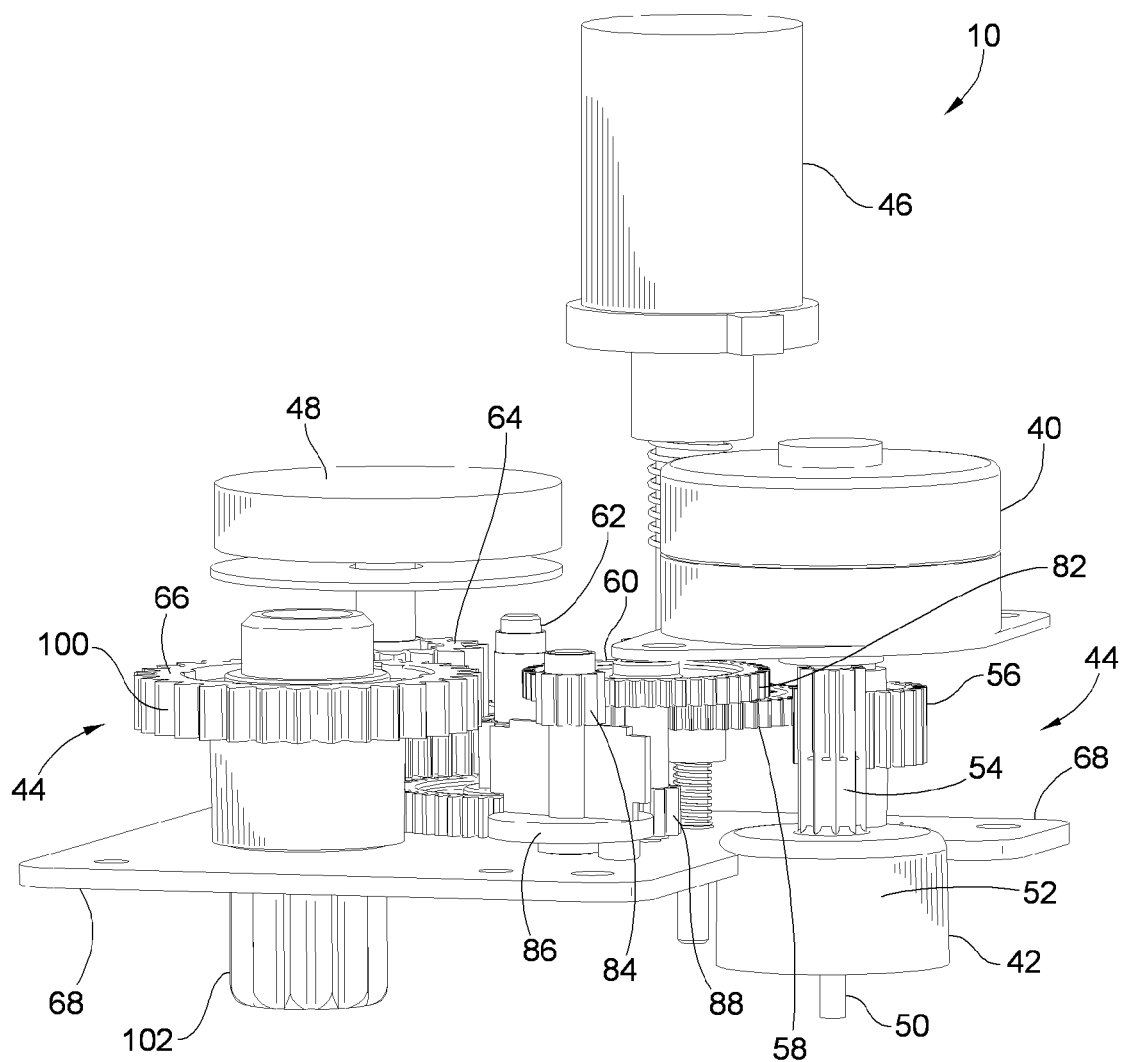
FIG. 6 is a perspective view of the actuator as shown in FIG. 5, but from a different vantage point.

As shown in illustrated embodiment of FIGS. 5 and 6, the single gear train 44 in the actuator 10 includes an idler gear 56, a solenoid gear 58, a central gear 60, a transition gear 62, a spring gear 64, and an output gear 66 generally supported by a base plate 68. Each of the gears 56-66 includes a plurality of circumferentially-arranged teeth. Because the drive shaft 54 of the clutch 42 also includes a plurality of circumferentially-arranged teeth 70, the drive shaft 54 and the gear train 44 are operably coupled together. As shown in FIG. 5, the drive shaft 54 of the clutch 42 drives the idler gear 56 using the torque supplied by the motor 40.

The teeth 72 on the idler gear 56 are, in addition to the teeth 70 on the drive shaft 54 of the clutch 42, also engaged with a lower set of teeth 74 on the solenoid gear 58. The outer circumference of the lower set of teeth 74 on the solenoid gear 58 is larger than the outer circumference of the teeth 72 on the idler gear 56. Therefore, the gear ratio between the idler gear 56 and the lower set of teeth 74 on the solenoid gear 58 is less than one when the gears are motor 40 driven. Practically speaking, when the gear ratio is less than one, the output gear rotates more slowly than the input drive gear. In contrast, when the gear ratio is greater than one, the output gear rotates more quickly than the input drive gear.

As shown, the solenoid gear 58 rotates on an elongate shaft 76. The shaft 76 generally supports a spring 78 interposed between the teeth 74 and the base plate 68. When the solenoid 46, which is a bi-stable device, is pulsed with current in one direction, the plunger of the solenoid is drawn upwardly away from the base plate 68 and latched in place as shown in FIG. 5. In that position, the solenoid gear 58 is generally engaged with both the idler gear 56 and the central gear 60. In the illustrated embodiment, the plunger of the solenoid 46 is spaced apart from, and does not contact, the solenoid gear 58.

However, when the solenoid 46 is pulsed with current in an opposite direction, the permanent magnetic field of the solenoid is opposed. This permits the spring of the solenoid 46 to drive the plunger against an upper portion of the shaft 76 supporting the solenoid gear 58. The downward force on the shaft 76 compresses spring 78 and disengages the solenoid gear 58 from the central gear 60. When the solenoid gear 58 is in this position, the clock spring 48 drives the air brake 86 instead of the motor 40.

upon a loss of power, the solenoid 46 permits or forces the solenoid gear to fall out of engagement with the idler gear 56. In the illustrated embodiment, the solenoid gear 58 drops vertically down toward the base plate 68 to disengage the motor 40 from a portion of the gear train 44 and, in particular, the spring gear 64 and the control valve.

The upper set of teeth 80 on the solenoid gear 58 is engaged with an upper set of teeth 82 on the central gear 60. The outer circumference of the upper set of teeth 82 on the central gear 60 is larger than the outer circumference of the upper set of teeth 80 on the solenoid gear 58. Therefore, the gear ratio between the upper set of teeth 80 on the solenoid gear 58 and the upper set of teeth 82 on the central gear 60 is less than one when the solenoid gear is considered the motor 40 driven gear.

As shown in FIG. 6, the upper set of teeth 82 on the central gear 60 is also engaged with teeth 84 on an air brake 86. In the illustrated embodiment, the air brake 86 includes two opposing paddles. The air brake 86 is rotatably mounted on the base plate 68 and, in the illustrated embodiment, engages the gear train 44 through the central gear 60. In this configuration, the motor 40 drives the air brake 86 through the idler gear 56, solenoid gear 58, and central gear 60 (collectively referred to as a first portion of the gear train 44). Because the gear ratio of the first portion of the gear train 44 is less than one, the air brake 86 rotates relatively slowly when driven by the motor 40. Because of the relatively slow rotation of the air brake 86, there is little added drag on the operation of the motor 40, i.e. very little breaking force is generated.

Referring back to FIG. 5, the lower set of teeth 88 on the central gear 60 is engaged with a lower set of teeth 90 on the transition gear 62. The outer circumference of the lower set of teeth 88 on the central gear 60 is smaller than the outer circumference of the lower set of teeth 90 on the transition gear 62. Therefore, the gear ratio between the lower set of teeth 88 on the central gear 60 and the lower set of teeth 90 on the transition gear 62 is less than one when the central gear 60 is considered the motor 40 driven gear.

The upper set of teeth 92 on the transition gear 62 is engaged with a lower set of teeth 94 on the spring gear 64. The outer circumference of the upper set of teeth 92 on the transition gear 62 is smaller than the outer circumference of the lower set of teeth 94 on the spring gear 64. Therefore, the gear ratio between the upper set of teeth 92 on the transition gear 62 and the lower set of teeth 94 on the spring gear 64 is less than one when the transition gear 62 is considered the motor 40 driven gear.

As shown in FIG. 5, the clock spring 48 is mounted on a shaft 96 supporting the spring gear 64. One end of the clock spring 48 is coupled to the housing 12 through one of the structural support members 36 (see FIGS. 1 and 4) and the other end of the clock spring is coupled to the shaft 96. As a result, when the spring gear 64 is driven by the motor 40, the clock spring 48 is wound and stores mechanical energy. As will be more fully explained below, the stored mechanical energy permits the clock spring 48 to drive the spring gear 64, the transition gear 62, and the central gear 60 (collectively referred to as a second portion of the gear train 44) in a direction opposite the direction that the motor 40 drives the second portion of the gear train. In addition, the stored mechanical energy permits the clock spring 44 to drive the output gear 66 so that the control valve moves to its fail safe position.

When the second portion of the gear train 44 is clock spring 48 driven, the gear ratio of the spring gear 64, which is considered the drive gear, to the transition gear 62 is greater than one. Likewise, the gear ratio of the transition gear 62 to the central gear 60 is also greater than one when the clock spring 48 drives these gears. As a result, the air brake 86 (see FIG. 6) rotates relatively quickly, particularly when compared to the rotational speed of the air brake when driven by the motor 40. In other words, when the air brake 86 is driven by the motor 40 in one direction, the air brake rotates slow and provides little or no braking action to oppose the motor 40. However, when the air brake 86 is driven by the clock spring 48 in the opposite direction, the very rapid rotation of the air brake provides considerable braking action, which effectively controls the release of mechanical energy stored in the clock spring 48.

Referring to FIG. 5, the upper set of teeth 98 on the spring gear 64 is engaged with an upper set of teeth 100 (see FIG. 6) on the output gear 66. The outer circumference of the upper set of teeth 98 on the spring gear 64 is smaller than the outer circumference of the upper set of teeth 100 on the output gear 66. Therefore, the gear ratio between the upper set of teeth 98 on the spring gear 64 and the upper set of teeth 100 on the output gear 66 is less than one when the spring gear is considered the motor driven gear.

Figure 7:
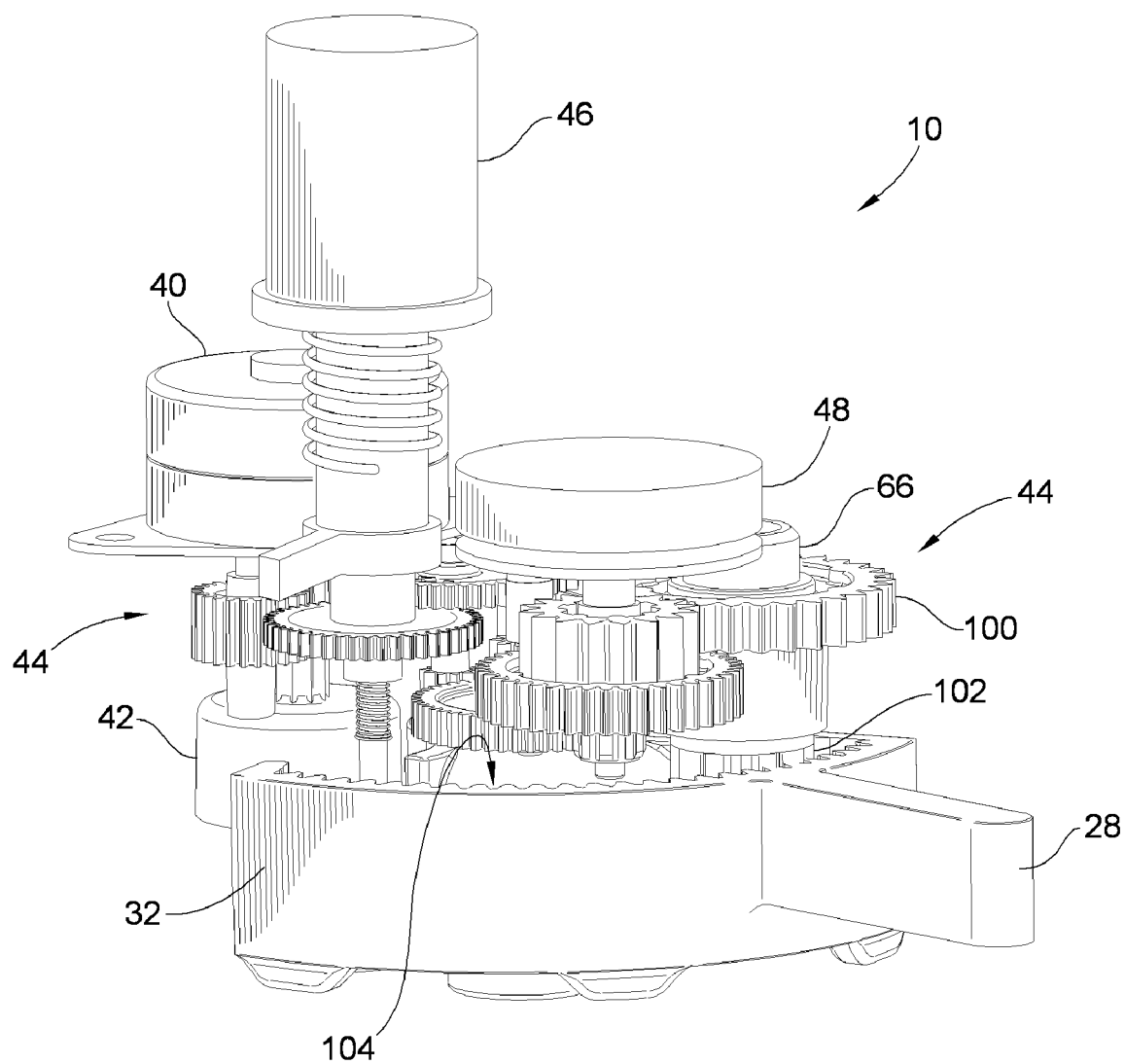
FIG. 7 is perspective view of the actuator of FIG. 5, but including the control valve drive member.

A lower set of teeth 102 on the output gear 66 is engaged with teeth 104, best illustrated in FIG. 7, of the control valve drive member 32 which has been replaced for the purpose of illustration. Because the control valve drive member 32 is operably coupled to the control valve (not shown), the motor 40 and the clock spring 48 are each able to, at particular times, move the control valve. The motor 40 generally utilizes the entire gear train 44 to move the control valve while the clock spring 48 only utilizes the spring gear 64 and the output gear 66. Also, when the motor 40 is driving the air brake 86, only the first portion of the gear train 44 is employed. In contrast, when the clock spring 48 is driving the air brake 86, only the second portion of the gear train 44 is employed.

In operation, the solenoid 46 is latched to ensure that the solenoid gear 58 is engaged with adjacent gears which, in the illustrated embodiment, are the idler gear 56 and the central gear 60. In addition, the motor 40 is energized. As such, the motor 40 is able to drive the control valve, via the gear train 44 and the control valve drive member 32, into the desired position. During this time, because of the configuration of the idler gear 56 and the central gear 60, the air brake 86 rotates relatively slowly and provides little braking force. As such, the motor 40 operates without being significantly or detrimentally hindered by the slow rotation of the air brake 86. Simply put, the air brake 86 is moving far too slowly to undesirably tax the motor 40 due to the gear ratio noted above.

When power to the motor 40 is interrupted or lost, the solenoid 46 is pulsed to disengage the solenoid gear 58 from the central gear 60. Therefore, the motor 40 is effectively isolated from a portion of the gear train 44. With the motor 40 no longer driving the gear train 44 and disengaged from the clock spring 48, the clock spring 48 is free to rotate and release its stored mechanical energy. When this occurs, the clock spring 48 drives the output gear 66 such that the control valve drive member 32 moves the control valve to its fail safe position. The clock spring 48 also drives the transition gear 62, central gear 60, and air brake 86.

Because of the configuration of the transition gear 62 and central gear 60, the air brake 86 rotates relatively quickly and provides sufficient braking force to control the release of energy by the clock spring 48. As such, the clock spring 48 is able to move the control valve its fail safe position without damaging the gear train 44 or the control valve due to excessive speed.

From the foregoing, those skilled in the art will recognize that the actuator 10 operates without the need for separate and distinct gear trains. In addition, the actuator 10 is configured to drive an air brake 86 at different rates of speed in different directions depending on the state of the actuator as either powered or having lost power.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An actuator, comprising:
   a drive mechanism operably coupled through a first portion of a gear train to an energy dissipation apparatus, the first portion of the gear train having a first gear ratio of less than one to limit a rotational speed of the energy dissipation apparatus when the drive mechanism is powered; and
   an energy storage member operably coupled through a second portion of the gear train to the energy dissipation apparatus, the energy storage member configured to store energy provided by the drive mechanism, the second portion of the gear train having a second gear ratio of greater than one to increase the rotational speed of the energy dissipation apparatus when the drive mechanism is not powered and the energy storage member is utilized.

2. The actuator of claim 1, wherein the drive mechanism is an electric motor and the energy storage member is a clock spring.

3. The actuator of claim 1, wherein the energy dissipation apparatus is a paddle rotatably mounted on a spindle, the spindle having a set of circumferential teeth configured to engage the gear train.

4. The actuator of claim 1, wherein the energy storage member stores energy provided by the drive mechanism through the gear train.

5. The actuator of claim 1, wherein the gear train includes a disengaging gear, the disengaging gear operable to selectively disengage the drive mechanism from the energy dissipation apparatus.

6. The actuator of claim 5, wherein the disengaging gear is further operable to selectively disengage the drive mechanism from an output gear in the second portion of the gear train.

7. The actuator of claim 6, wherein the second portion of the gear train includes an output gear, the output gear operably coupled to a control valve drive mechanism.

8. The actuator of claim 7, wherein the output gear is further operably coupled to a valve position indicator.

9. An actuator, comprising:
a drive mechanism;
an energy storage mechanism;
an energy dissipation apparatus; and
a gear train configured to operably couple the drive mechanism, the energy storage mechanism, and the energy dissipation apparatus to each other such that, in a first state, the drive mechanism is operably coupled to the energy storage mechanism and the energy dissipation apparatus and, in a second state, the energy dissipation apparatus is operably coupled to the energy dissipation apparatus, and wherein the drive mechanism drives the energy dissipation apparatus through the gear train at a first rate in the first state and the energy storage mechanism drives the energy dissipation apparatus through the gear train at a second rate in the second state, the second rate being greater than the first rate.

10. The actuator of claim 9, wherein the first state occurs when electrical power is provided to the drive mechanism and the second state occurs when the electrical power to the drive mechanism is interrupted.

11. The actuator of claim 9, wherein the drive mechanism is an electrical motor, the energy storage mechanism is a clock spring, and the energy dissipation apparatus is a rotatable air brake including a paddle wheel.

12. The actuator of claim 9, wherein the gear train includes a gear operably coupled to a solenoid, the solenoid operating to disengage the drive mechanism from both the energy storage mechanism and the energy dissipation apparatus upon a loss of electrical power.

13. The actuator of claim 9, wherein a clutch is interposed between the drive mechanism and the gear train, the clutch operating to limit torque supplied by the drive mechanism on the gear train.

14. The actuator of claim 9, wherein the energy dissipation apparatus stores no energy in the first state and stores energy provided by the drive mechanism in the second state.

15. The actuator of claim 9, wherein the gear train is operably coupled to a control valve, the energy storage mechanism operating to drive the control valve to a closed position upon a loss of power to the drive mechanism.

16. The actuator of claim 9, wherein the actuator further includes a position indicator, the position indicator visually communicating a position of a control valve operably coupled to the actuator.

17. The actuator of claim 9, wherein the actuator further includes a manual release lever, the manual release lever transitioning the gear train between the first state and the second state.

18. An actuator, comprising:
a motor configured to drive a control valve;
a clutch operably coupled to the motor, the clutch configured to prevent the motor from transferring more than a predetermined amount of torque;
a gear train operably coupled to the clutch, the gear train configured to receive the predetermined amount of torque from the motor;
a solenoid operably coupled to the gear train, the solenoid configured to disengage one of the gears in the gear train from adjacent gears;
a clock spring operably coupled to another of the gears in the gear train, the clock spring configured to store mechanical energy supplied by the motor, the clock spring configured to drive the control valve; and
an air brake operably coupled to the gear train, the air brake configured to dissipate a portion of the mechanical energy released by the clock spring.

19. The actuator of claim 18, wherein the motor drives the air brake in a first direction at a first rate and the clock spring drives the air brake in a second direction at a second rate, the first direction opposite the second direction, the second rate greater than the first rate.

20. The actuator of claim 18, wherein, upon a loss of power to the motor, the clock spring is configured to release the mechanical energy to drive the control valve toward a closed position.

\* \* \* \* \*